Figure 5:
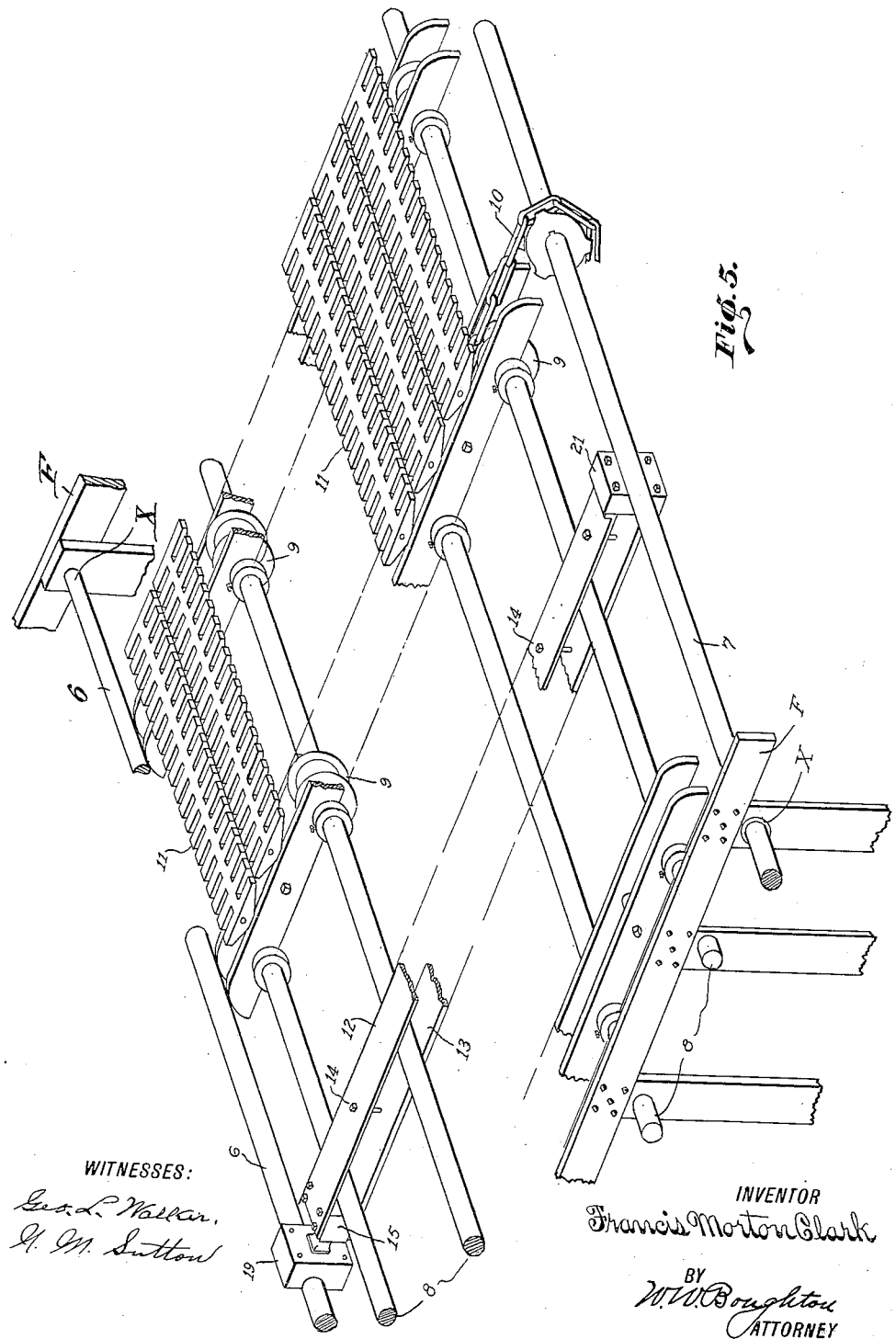

F. M. CLARK.
SUPPORTING MECHANISM FOR ENDLESS TRAVELING GRATES.
APPLICATION FILED MAY 3, 1912.
1,094,703.
Patented Apr. 28, 1914.
3 SHEETS—SHEET 1.
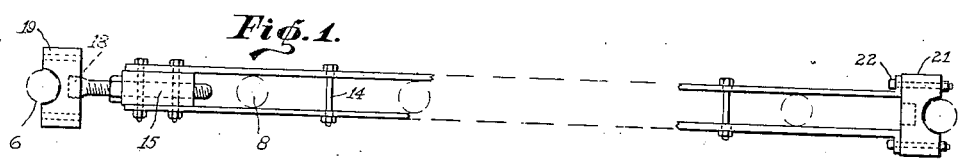
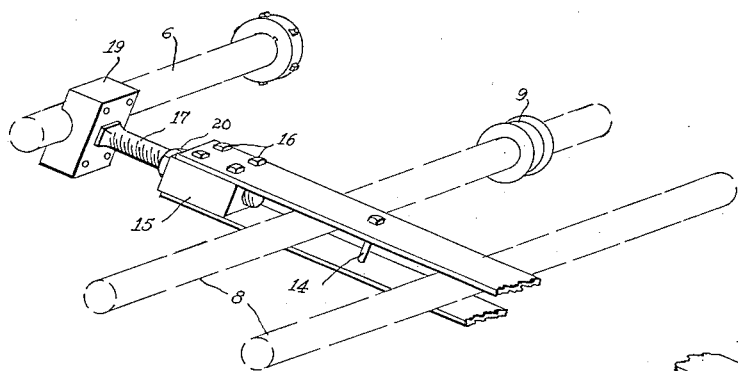
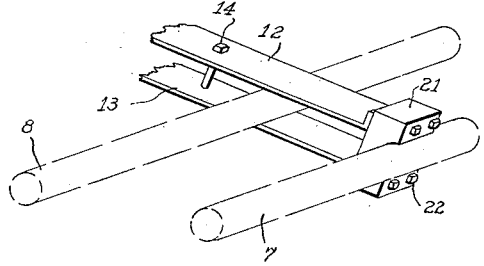
WITNESSES:
Geo. L. Walker
H. M. Sutton
INVENTOR
Francis Morton Clark
BY W. W. Boughton
ATTORNEY

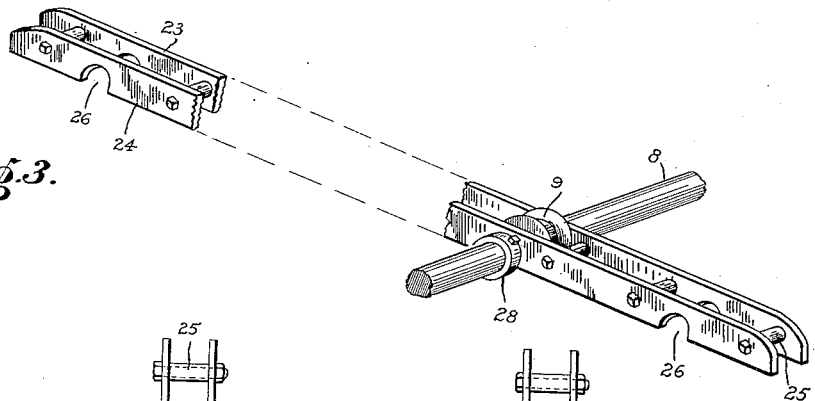
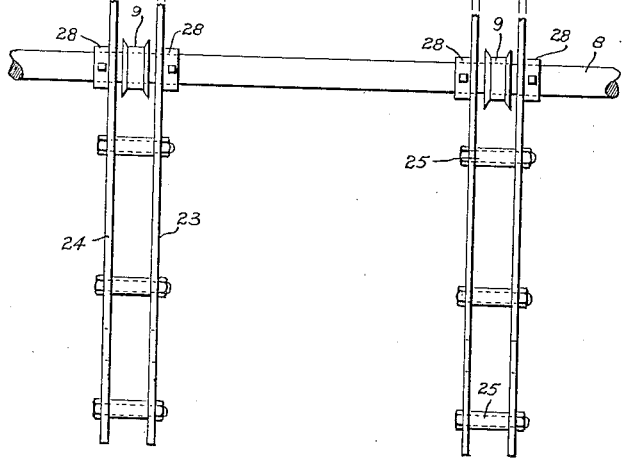

F. M. CLARK.
SUPPORTING MECHANISM FOR ENDLESS TRAVELING GRATES.
APPLICATION FILED MAY 3, 1912.

1,094,703.

Patented Apr. 28, 1914.
3 SHEETS—SHEET 3.

WITNESSES:
Geo. L. Walker.
H. M. Sutton

INVENTOR
Francis Morton Clark
BY
W. W. Boughton
ATTORNEY

UNITED STATES PATENT OFFICE.

FRANCIS MORTON CLARK, OF GARDEN CITY, NEW YORK, ASSIGNOR TO MULTIPLE-GRATE-BAR ENDLESS CHAIN STOKER COMPANY, A CORPORATION OF NEW YORK.

SUPPORTING MECHANISM FOR ENDLESS TRAVELING GRATES.

1,094,703.  Specification of Letters Patent.  Patented Apr. 28, 1914.

Application filed May 3, 1912. Serial No. 694,823.

*To all whom it may concern:*

Be it known that I, FRANCIS MORTON CLARK, a citizen of the United States, residing at Garden City, in the county of Nassau and State of New York, have invented a certain new and useful Improvement in Supporting Mechanism for Endless Traveling Grates, of which the following is a full, clear, and exact description.

My invention is an improvement in mechanical stokers of the endless traveling grate type and relates more particularly to reinforcing means for preventing deflection of the sprocket shafts intermediate their end journals and to means for supporting the upper run of the grate intermediate the idlers over which the conveyer chains run.

My invention, while of general applicability to traveling grates, is especially adapted for use in connection with a mechanical stoker such as that shown and described in the application of Harvey Iserman, Serial Number 648,745, filed September 11, 1911, to which I have permission to refer.

The objects of my invention are, first, to provide reinforcing means which shall support the sprocket shafts in a direction longitudinal of the grate to prevent deflection of such shafts due to the strain placed thereon by conveyer chains intermediate the ends of said shafts and to so locate such supporting means that the travel of the grate will not be interfered with; and, second, to provide means, intermediate the idlers on which the upper run of the conveyer chains rests between the front and rear sprockets, on which the grate may rest to prevent sagging thereof, and to relieve the front and rear sprocket shafts of a portion of the weight of said grate.

In the drawings accompanying this application and forming a part thereof, Figure 1 is a side view, a portion of the middle being broken away, showing the shaft reinforcing means; Fig. 2 is a perspective more fully showing the shaft reinforcing means and the relation between the shaft reinforcing means and the shafts upon which the idlers are mounted; Fig. 3 is a perspective view of the chain supporting rails and one of the idler shafts; Fig. 4 is a plan view showing two of the sets of rails illustrated in Fig. 3; and Fig. 5 is a perspective, the middle portion being broken away, showing the parts heretofore mentioned in relation to the traveling grate, only a portion of which latter is shown for the sake of clearness of illustration.

Referring more particularly to Fig. 5, the grate is mounted on a front driven sprocket shaft 6 and a rear sprocket shaft 7 both of which are mounted in the main frame F of the stoker in journals laterally exterior of the grate, of which only two, indicated by the letter X, are shown for lack of room on the sheet. It will be understood, however, that similar bearings are provided for the remaining ends of the respective shafts. Also mounted in the stoker frame are the non-revoluble idler carrying shafts 8, which may be solid or pipe as preferred. These shafts carry idlers 9 free to rotate thereon and on which run the conveyer chains 10 of the grate 11.

The grate illustrated and described in said Iserman application is capable of being expanded to any desired width by the addition of more grate bar sections and conveyer chains 10, and, in the case of grates of considerable width, several of these intermediate conveyer chains are employed. These intermediate chains, if maintained at the same tension as the outer chains, which is very desirable, place a heavy tension on the shafts 6 and 7 and tend to distort them in a direction longitudinal of the grate. To resist this tendency to distortion, I have provided the reinforcing means shown in detached view in Figs. 1 and 2 in which 12 and 13 are upper and lower flat members, preferably of wrought iron or steel though castings may be employed, which straddle the shafts 8 and on which they are clamped by bolts 14. At one end of the plates 12, 13, (preferably at the front) is a cast iron block 15, held in place by bolts 16, which permits free passage of the threaded shaft 17. The shaft 17 has a square head 18 adapted to fit in a similar shaped recess in a half-journal 19 which bears against the shaft 6. A thrust nut 20 on the shaft 17 bears against the block 15 in position to adjust the length of the reinforcing means. At the other end of the flat members 12, 13, a half-journal 21 is fixed by the bolts 22. By turning the nut 20 the reinforcing means may be adjusted to the proper length to keep the shafts 6 and 7 from distortion and, when adjusted, the bolts 14 are tightened to cause the plates 12, 13, to grasp the shafts 8 and hold the entire structure rigid and in fixed position.

While I have shown only one shaft reinforcing means, and find that a single one is usually sufficient, it will be obvious that more than one may be employed without departing from my invention.

In Figs. 3 and 4 I have shown in detached views the grate supporting mechanism. It consists of a series of pairs of rails 23, 24, one pair for each conveyer chain, joined at frequent intervals by spacer bolts 25 and notched at 26 to receive the shafts 8 upon which the rails are supported. Collars 28 on the shafts 8 hold the supporting rails against lateral displacement and in position on the shafts with the idlers 9 between the pairs of rails. The upper surface of the rails is a little below the bearing surface of the idlers so that the conveyer chains 10 when passing over the idlers are supported thereby. Between the idlers either the horizontal links of the chains 10 or the lower portion of the grate bars contact with the rails preventing the grate from sagging and transferring that portion of the weight which the rails receive to the shafts 8, thus lessening the load imposed on the chain and the tension exerted against the sprocket shafts. I have so proportioned the parts that the lower portion of the grate bars contact with the rails but it will be obvious that should the design of the grate bar require, or should it for any other reason be found desirable, the parts may be so made that the horizontal links of the conveyer chain may engage the rails without departing from my invention.

I am aware that it has been proposed to provide stokers with shaft reinforcing means which comprise a truss frame adjacent each end of the grate and struts for preventing deflection of the sprocket shafts. All of these structures are, however, necessarily heavy, cumbersome, and expensive and require the manipulation of two adjusting screws; whereas in my device the thrust from the two sprocket shafts is opposed and therefore taken up, the adjustment is accomplished by the turning of a single screw, and the pressure exerted is necessarily the same on the two shafts. The employment of supporting rails for the grate carried on idler shafts has the decided advantage of dispensing with cross beams or other supporting devices intermediate the upper and lower runs of the grate, thus materially lightening the structure and leaving this space free for the use of the shaft reinforcing means.

Having thus described my invention what I claim and desire to secure by Letters Patent is:

1. In a mechanical stoker, a frame, front and rear shafts journaled in said frame, sprockets on said shafts, an endless grate traveling on said sprockets, reinforcing means independent of the frame and extending from the front to the rear shafts, means for adjusting the length of said reinforcing means, and half-journals at the ends of said reinforcing means and engaging said sprocket shafts to maintain them in alinement.

2. In a mechanical stoker, a frame, front and rear shafts journaled in said frame, sprockets on said shafts, non-rotatable idler shafts mounted in said frame, an endless grate traveling on said sprockets, bifurcated reinforcing means straddling said idler shafts, means for clamping said reinforcing means to said idler shafts, half-journals mounted at each end of said reinforcing means in position to engage said front and rear shafts, and means for adjusting the distance between said half-journals.

3. In a mechanical stoker, front and rear sprocket shafts, sprockets thereon, idler shafts intermediate said sprocket shafts, idlers thereon, a grate traveling over said sprockets and supported in its upper run on said idlers, and means intermediate said idlers, and resting on said idler shafts, for aiding in supporting said grate.

4. In a mechanical stoker, a frame, front and rear sprocket shafts mounted in said frame, idler shafts mounted in said frame intermediate said sprocket shafts, idlers on said idler shafts, a grate traveling over said sprockets and supported in its upper run on said idlers, and means intermediate said idlers, and resting on said idler shafts, for aiding in supporting said grate.

5. In a mechanical stoker, a frame, idler shafts mounted thereon, idlers on said shafts, an endless traveling grate running on said idlers, and pairs of spaced rails, one of which rails is located on each side of said idlers, said rails being supported on said idler shafts in position so that their upper surfaces will engage the grate at points intermediate the idlers to assist in supporting the grate.

6. In a mechanical stoker, a frame, idler shafts mounted thereon, idlers on said shafts, front and rear sprockets, an endless traveling grate running on said sprockets and idlers, and pairs of spaced rails, one of which rails is located on each side of said idlers, said rails being supported on said idler shafts and extending from a point adjacent the front sprockets to a point adjacent the rear sprockets, in position such that their upper surfaces engage the grate at points intermediate its sprocket and idler support to assist in supporting the grate.

In testimony whereof, I hereunto affix my signature in the presence of two witnesses.

FRANCIS MORTON CLARK.

Witnesses:
  MEREDITH CLARK,
  MARY WALKER.